United States Patent

[11] 3,575,128

| [72] | Inventors | Stuart D. Pool<br>Wheaton;<br>Charles V. Everett, Warrenville, Ill. |
|---|---|---|
| [21] | Appl. No. | 776,950 |
| [22] | Filed | Nov. 19, 1968 |
| [45] | Patented | Apr. 13, 1971 |
| [73] | Assignee | International Harvester Company<br>Chicago, Ill. |

[54] COLOR CODED ROTATION-RATE INDICATOR
1 Claim, 4 Drawing Figs.

[52] U.S. Cl. ................................................ 116/57,
    116/74, 116/115
[51] Int. Cl. ................................................ B60q 1/54
[50] Field of Search ........................ 73/(Inquired);
    116/116, 57, 115, 115.5, 74; 356/27

[56] References Cited
UNITED STATES PATENTS

| 1,532,548 | 4/1925 | Ramsey | 116/57 |
| 2,286,014 | 6/1942 | Rowe | 116/127LUX |
| 3,466,928 | 9/1969 | Kind | 350/96(B)X |

Primary Examiner—Ronald L. Wibert
Assistant Examiner—Orville B. Chew, II
Attorney—Noel G. Artman ABSTRACT: An apparatus for indicating to an operator the rotational rate of an element that is located remotely from the operator. A multicolored reflector is secured to the rotating element and a beam of light reflected off said multicolored reflector is transmitted through a fiber optic cable to the operator's station. The operator can by observing the beam of light emitted from the fiber optic cable ascertain the rotational rate of the element.

Patented April 13, 1971
3,575,128
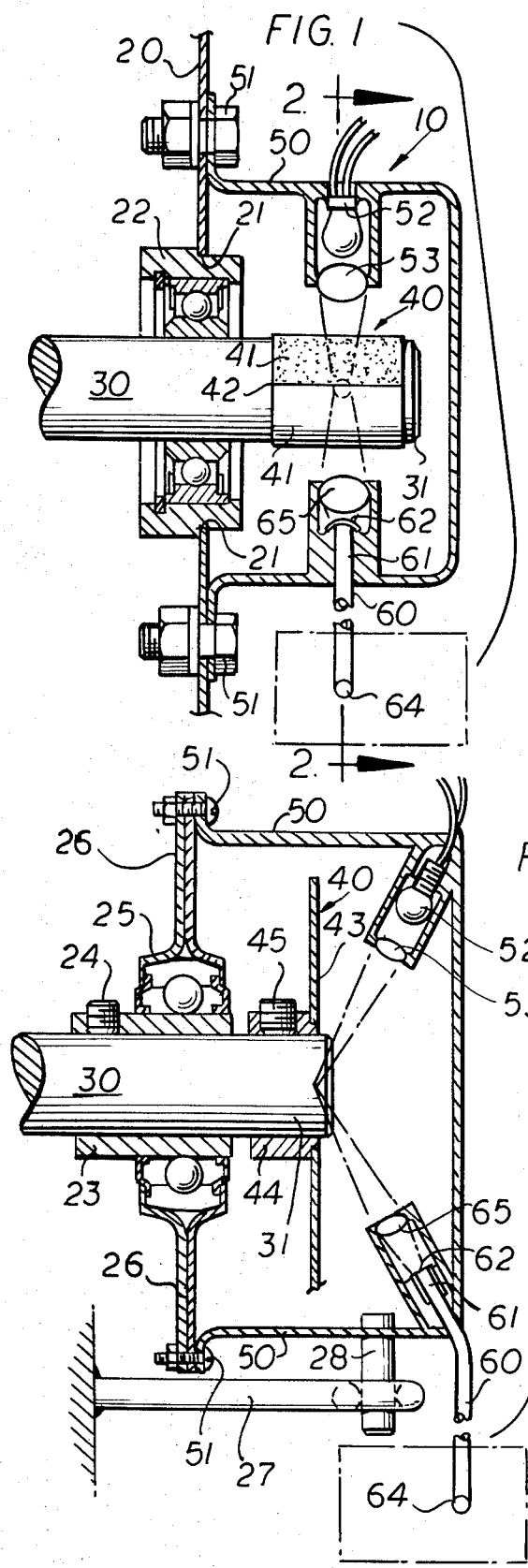
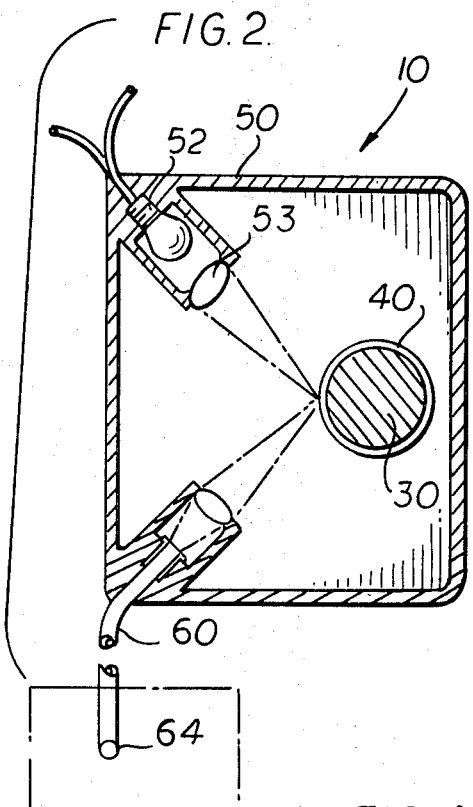
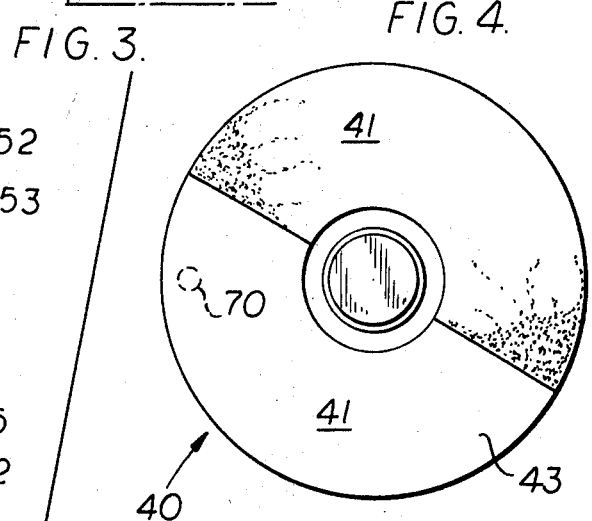
INVENTORS
STUART D. POOL
CHARLES V. EVERETT
ATT'Y

COLOR CODED ROTATION-RATE INDICATOR

BACKGROUND OF THE INVENTION

1. Field of the Invention

The present invention relates generally to improvements in rotating shaft indicators and the like and more particularly to a new and improved rotating shaft indicator wherein a beam of light transmitted through a fiber optic cable conveys the information from the rotating element to the operator's station.

2. Description of the Prior Art

This invention was developed for use on a self-propelled combine harvester. In the original self-propelled combines the operator's platform was exposed to the weather and dust, the operator sat on a hard steel seat and felt every machine vibration through the seat, the steering wheel, the brake and the clutch pedals. The sounds from every moving element of the machine surrounded the operator and the weather conditions left him uncomfortably hot or cold. However, the same factors responsible for his discomfort established an acute rapport between the operator and his machine. There were literally hundreds of machine signals to which the operator could respond automatically. In today's modern self-propelled combines the operator sits comfortably in an air conditioned cab where he is insulated from the machine noises, vibrations, odors and is unable to see the shrouded drive of his machine. Thus the operator no longer has the ability to sense the condition of the various components of the machine. Numerous components of the combine are driven by rotating shafts which under normal conditions have a minimum or prescribed speed range. If the operator can be alerted when one of these rotating shafts stops or slows beyond a critical speed he can take the necessary action and avoid damaging the machine. Electronic monitoring devices have been developed for this purpose which cause the frequency of a flickering light to change in response to the change in the speed of the rotating shaft or to sound a buzzer or light a warning light when a shaft has stopped rotating. Some of the available devices such as the flickering light do not provide sufficient contrast to attract the operator's attention, while others such as the buzzer have been criticized for startling the operator. Devices that startle the operator are undesirable because they create a temptation for the indifferent operators to disconnect the warning system. In a device where a light is either turned on or off to indicate that the shaft is rotating or not rotating, the operator receives no information that the shaft has merely slowed down and it is often too late to prevent damage to the machine after the shaft has completely stopped. Reference may be made to the patent to Swanson No. 3,368,214 of Feb. 6, 1968 for a showing of an available monitoring device.

SUMMARY

The general purpose of this invention is to provide a rotating shaft indicator which embraces all the advantages of similarly employed indicators and possesses none of the aforedescribed disadvantages. To attain this the present invention contemplates a unique reflector carried by the rotating shaft which reflects a beam of light that is then transmitted to the operator's station through a flexible optic cable where it can be interpreted by the operator as an indication of shaft speed. The reflector has several colors and thus the reflected beam of light is first one color and then another. The persistence of the human eye is such that it will retain an impression for a fraction of a second. Thus when the eye receives an impression of a red beam of light and while it is retaining this impression it receives the impression of a green beam of light the observer will not perceive of the red or green beams, but rather will mix the two beams to perceive a yellow light. Time is the critical factor as to whether the individual red and green colors are perceived or whether the blended yellow color is perceived. When the human eye receives approximately 30 sets of red and green impressions per second, the observer will perceive a constant yellow color. As the number of sets per second diminishes the observer will perceive movement, a flickering and eventually will recognize the independent red and green color. It should be noted that the precise speed at which a constant blended color is perceived will vary from individual to individual. An object of the invention is to provide a rotating shaft indicator that will provide sufficient contrast to alert the operator and also enable him to make some judgment as to the speed of the shaft that has fallen below the critical speed but has not yet come to a complete halt.

BRIEF DESCRIPTION OF THE DRAWINGS

FIG. 1 is a cutaway view of the rotating shaft indicator;

FIG. 2 is a cross-sectional view taken along lines 2-2 of FIG. 1;

FIG. 3 is a cutaway view of a second embodiment of the rotating shaft indicator; and FIG. 4 is an isolated view of the multicolored disc of the embodiment shown in FIG. 3.

DESCRIPTION OF THE PREFERRED EMBODIMENTS

Referring now to the drawings wherein like reference characters designate like or corresponding parts throughout the several views, there is shown in FIGS. 1 and 2 a revolution indicator designated 10. In FIG. 1 there is shown a supporting wall 20 having an aperture 21 formed therein. A bearing 22 is secured to the supporting wall 20 within the aperture 21. A rotating shaft or element 30 is journaled in the bearing 22 and has a free end portion 31. A band-shaped multicolored reflector 40 is mounted on the free end portion 31 of the rotating shaft. The multicolored reflector has at least one set of sectors or bands 41 and each set 42 includes at least two sectors or bands 41. The sectors or bands making up a set are of different colors, for example, one red and one green sector comprise a set. In FIGS. 1 and 2 the reflector 40 is made up of one set 42 having two sectors 41. However, it should be understood that the reflector could be made up of any number of sets. As shall be described in more detail the number of sets will be determined by the critical speed of the particular shaft being observed. If the shaft rotates relatively slow a large number of sectors would be required and if the shaft rotates relatively fast a small number of sectors would be required.

A cap-shaped cover 50 is secured by fastening means 51 to the supporting wall 20 such that it covers the bearing 22 and the free end portion 31 of the rotating shaft. On the internal surface of the cap-shaped cover there is a light source designated 52 and a lens 53. The lens 53 is arranged between the light source and the reflector such that it will focus a beam of light to a focus area on the reflector. One end 61 of a fiber optic cable 60 is mounted in the cap-shaped cover. The fiber optic cable has a light-receiving face 62 at its one end and is located such that the beam of light originating from the light source 52 and bouncing off of the reflector 40 will be received by the light-receiving end 62. A lens 65 is positioned between the reflector 40 and the light-receiving face 62 and functions to focus the beam of light on the light-receiving face. The fiber optic cable 60 has formed at another end a light emitting face 64 upon which the operator can observe the beam of light that has been transmitted through the cable.

Referring now to FIGS. 3 and 4 wherein another embodiment of the invention is disclosed, in this embodiment the revolution indicator 10 is supported on the free end portion 31 of the rotating shaft 30. The inner race 23 of the bearing is secured to the shaft 30 by a setscrew 24. The outer race 25 of the bearing has a flange 26 to which the cap-shaped cover 50 is secured by fastening means 51. A stop 27 is secured to some fixed part of the machine as located adjacent the cap-shaped cover 50. An arm 28 projects outwardly from the cap-shaped cover 50 such that it will engage the stop 27. Thus as the shaft 30 rotates the cap-shaped cover 50 will be prevented from rotating by engagement of the arm 28 with the stop 27.

In this embodiment of the invention the multicolored reflector 40 is in the form of a disc 43 that is mounted on a sleeve 44. The sleeve 44 is secured to the free end portion 31 of the rotating shaft 30 by a setscrew 45. As illustrated in FIG. 4, the disc 43 has one set 42 of sectors 41. It should be understood, of course, that the disc 43 could be made up of multiple sets of sectors and the sectors would be of wedge-shape. A beam of light from the source 52 is concentrated by lens 53 to a focus spot 70 on the multicolored reflector 40. The beam of light reflects off reflector 40 and is concentrated by lens 65 on the light-receiving end 62 of the optic cable 60. The operator can then, by observing the beam of light as it is emitted through the face 64, determine the condition of shaft 30.

It should be noted that the revolution indicator is built such that the multicolored reflector is removable so that one reflector can be removed and replaced by another. This is done so that reflectors of different colors can be interchanged for each other and also so that it is convenient to change the number of sets contained on a reflector. As has been previously stated, the human eye completely mixes the colors when approximately 30 sets per second are seen. Thus if we have a shaft where it is important to know when a speed drops below 300 revolutions per minute we would use a reflector having six sets of sectors and thus the viewer would see 1800 sets per minute or 30 sets per second. If the speed of the shaft drops below 300 revolutions per minute the operator will no longer perceive a steady light but rather will notice some movement. As the speed of the shaft continues to diminish the operator will perceive flickering lights of the actual sector colors and the frequency will continue to diminish until the shaft has completely stopped at which time the observer will perceive a constant light the color of one of the sectors. If the critical speed of the shaft in the above example had been 100 rather than 300 revolutions per minute then a reflector having 18 rather than 6 sets would have been used. If the speed for the shaft had been 900 rather than 300 revolutions per minute, then a reflector having 2 sets would have been used.

Various color combinations other than red and green can, of course, be used. It should be noted, however, that color mixing of light beams does not follow the rules of pigment mixing. The three primary colors are different and superimposed color beams are added to produce lighter and brighter mixed colors. If all three primary colors are used, the resulting blend is a white light. This characteristic of mixing light beams is responsible for the contrasting colors sufficient to alert the operator.

We claim:

1. In a revolution indicator for remotely indicating whether the speed of a rotating element is above or below a specific rate comprising:

a reflector fixed to said rotating element, said reflector having sets of sectors, each sector being a different color, said sectors arranged such that during rotation of the rotating element all sectors move past a common area, the width and number of said sectors being such that when the rotating element is at said specific rate approximately 30 sets of sectors move past said common area per second;

a light source directing a beam of light to a spot within said common area;

a fiber optic cable having one end fixed adjacent said rotating element, said one end having a light-receiving face formed thereon;

said light source, reflector and light-receiving face arranged such that the beam of light from the source reflects off said reflector and is received by the light-receiving face;

a first lens provided between said light source and said reflector to focus the light on said reflector;

a second lens provided between said reflector and said light-receiving face to focus the light on said light-receiving face;

a protective cover enclosing said reflector, said light source, said one end of the fiber optic cable, said first lens and said second lens to shield them from the surrounding environment, said protective cover also serving as the means for supporting said light source, said one end of the fiber optic cable, and said first and second lens;

said fiber optic cable having another end located at a station remote from said rotating element, said other end having a light-emitting face formed thereon; and said fiber optic cable receives light impinging upon said light-receiving face and emits said light from said light-emitting face, such that a human observer can perceive changes on said light-emitting face as the speed of said rotating element changes.